June 24, 1930. J. F. O'CONNOR 1,765,875
FRICTION GEAR
Filed April 9, 1928
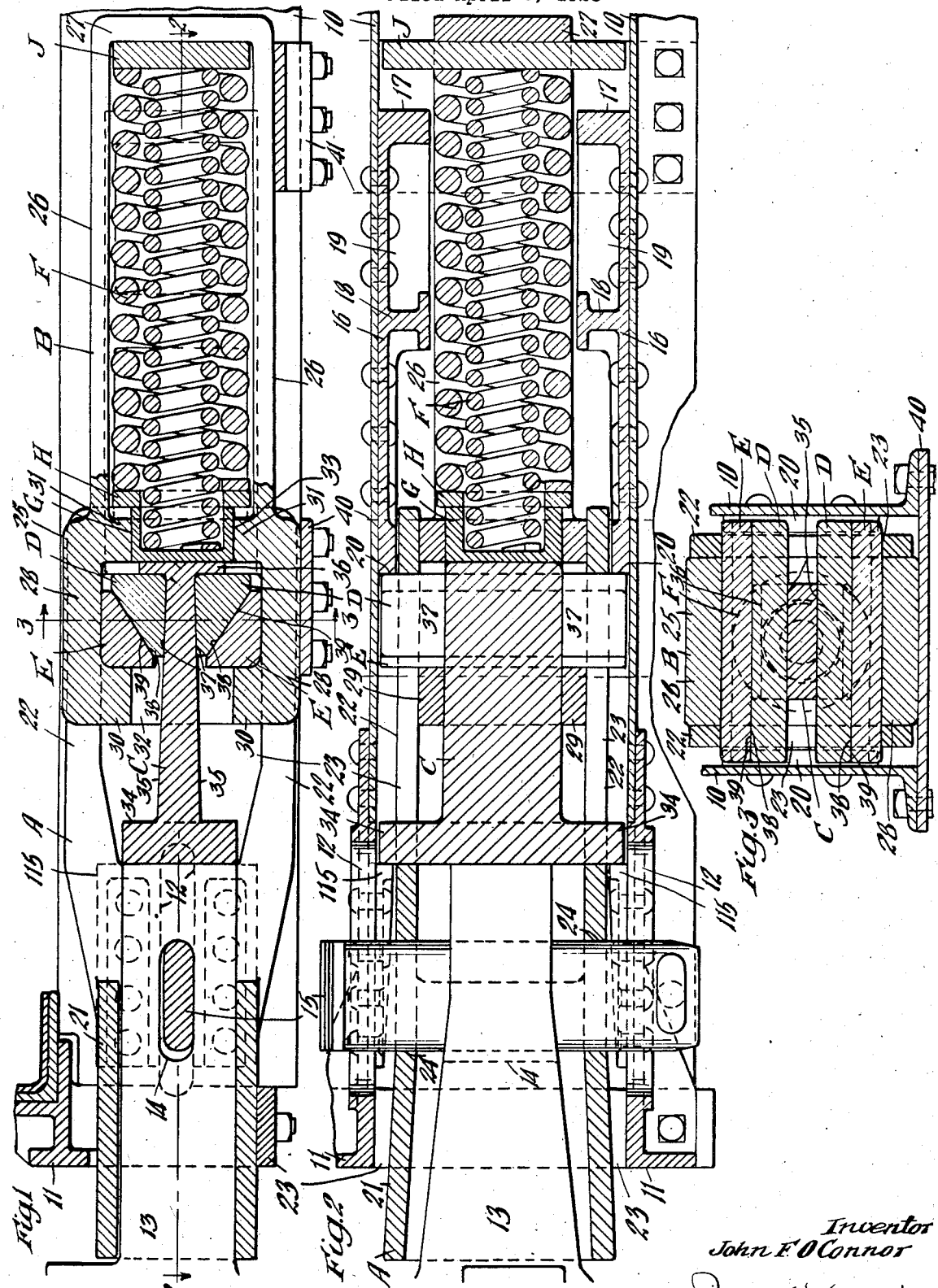
Inventor
John F. O'Connor
By Joseph Harris
His Atty.
Witness
Wm. Geiger Patented June 24, 1930

1,765,875

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION GEAR

Application filed April 9, 1928. Serial No. 268,565.

This invention relates to improvements in friction gears.

One object of the invention is to provide a friction gear especially adapted for railway draft riggings, actuated in both buff and draft, having a compression stroke in buff which is greater than the stroke in draft, and wherein a differential action is provided in both buff and draft, thereby materially increasing the capacity of the gear.

Another object of the invention is to provide a friction draft gear for railway cars, having the compression in draft approximating the usual stroke employed in standard draft gears and having a compression stroke in buff which is at least double of the stroke in draft, wherein the friction means is arranged to provide a certain amount of differential action to effect additional compression of the main spring resistance.

A further object of the invention is to provide a friction shock absorbing means including a spring resistance element, a friction system comprising co-operating friction elements wherein certain of said elements have the co-operating friction surfaces thereof inclined with respect to the longitudinal axis of the mechanism to provide for differential action and have their relative movement opposed by the spring resistance and the latter is compressed from opposite ends by said friction elements during the differential movement in buff.

A more specific object of the invention is to provide a friction shock absorbing means, including a yoke-acting member having laterally, inwardly acting wedge means thereon, wedge friction blocks co-operating with said wedge means, a tapered friction post interposed between said friction wedge blocks and having friction surfaces on the opposite sides thereof converging inwardly of the mechanism and co-operating with friction surfaces of the wedge friction blocks, said friction post and blocks being relatively movable and having their movement opposed by a main spring resistance, wherein the pulling action in draft is applied to the wedge friction blocks and the pressure in buff is applied to the post.

Other and further objects of the invention will more clearly appear from the description and claims hereinafter following.

In the drawings, forming a part of this specification, Figure 1 is a longitudinal, vertical, sectional view of a portion of the draft rigging of a railway car, illustrating my improvements in connection therewith. Figure 2 is a horizontal, longitudinal, sectional view, corresponding substantially to the line 2—2 of Figure 1. And Figure 3 is a vertical, transverse, sectional view, corresponding substantially to the line 3—3 of Figure 1.

In said drawings, the usual channel-shaped center or draft sills of a railway car underframe are designated by 10—10. The usual striking casting, which is designated by 11, is employed at the outer ends of the sills, the striking casting as shown having rearwardly extending spaced side portions which form cheek plates. The cheek plates have the usual key-receiving slots which are designated by 12—12. The coupler of the car is designated by 13 and, as shown, is of the type having the shank thereof rearwardly tapered and provided with a transverse key-receiving slot or opening 14, through which the usual coupler key 15 extends. On the inner sides, the draft sills are provided with aligned stop lug castings 115—115 which have the stop shoulders at the inner ends thereof disposed forwardly of the rear ends of the slots 12 of the cheek plates.

In carrying out my invention, I provide combined guide and stop castings 16—16 which are disposed at the inner end portion of the gear. The stop castings 16 are provided with flat transverse faces 17 at the rear ends thereof, which act as limiting stops for the gear, as hereinafter more clearly pointed out. Midway between the ends thereof, the castings 16 are reinforced by vertically disposed ribs 18—18. Between the ribs and the rear end sections, the castings are provided with top and bottom horizontal webs 19—19 which form guide members, as hereinafter pointed out. At the front end portions, the castings 16 present flat transverse end faces 20 which also serve as limiting stops.

The shock absorbing mechanism proper of my improved railway draft rigging comprises a yoke element A; a combined yoke and wedge casing B; a combined friction post and follower C; wedge friction shoes D—D; wedge blocks E—E; a main spring resistance F; a spring follower cap G; a spring follower ring H; and a rear follower member J.

The yoke element A comprises a rectangular sleeve-like portion 21 at the forward end thereof, and rearwardly extending side members 22—22 which are continuations of the side walls of the sleeve-like portion. As shown in Figure 1, the top and bottom walls of the sleeve portion are arranged parallel and spaced apart such a distance as to substantially fit the shank of the coupler 13. The side walls of the sleeve portion are preferably flared outwardly, as shown in Figure 2, to permit of the required lateral swinging movement of the coupler shank. As shown, the sleeve-like section 21 of the yoke element A is slidably supported on the usual carry iron 23 which is supported from the striking casting 11. At the inner ends, the side members 22 of the yoke element A are slotted, as indicated at 23. The coupler key 15 extends through aligned slots 24 in the side walls of the sleeve-like portion 21 of the yoke element and substantially fits the slots so that the yoke element is compelled to move with the coupler in both buff and draft actions.

The combined yoke and wedge casing B comprises a box-like casing 25 having top and bottom arms 26 rearwardly extending therefrom, the arms 26 being spaced apart vertically and connected at their rear ends by a vertical end section 27 formed integral therewith. The arms 26 and the end section 27 together form the yoke proper of the combined yoke and wedge casing. The casing 25 is of substantially rectangular cross section and has spaced top and bottom walls 28—28, spaced side walls 29—29, and relatively short top and bottom end wall sections 30—30 and 31—31 at the front and rear ends thereof, thereby leaving the front end of the casing partly open, as indicated at 32, and providing an opening 33 at the rear end of the casing.

The combined friction post and follower C comprises an elongated, longitudinally extending main body portion which forms the post proper, the main body portion being provided with an integral plate-like section at the forward end thereof, forming the front main follower member 34. The post, as clearly illustrated in Figures 1 and 2, is of greater width than thickness and is tapered longitudinally, thereby providing top and bottom friction surfaces 35—35 which converge inwardly of the gear. At the inner end, the post is provided with a foot member 36, which is formed by top and bottom flanges extending at right angles from the post.

The wedge friction shoes D—D are disposed above and below the post C and are in the form of laterally, elongated, heavy bars, as most clearly illustrated in Figures 2 and 3. On the inner sides, the shoes D are provided with flat friction surfaces 37—37, co-operating directly with the top and bottom friction surfaces 35—35 of the post. At the inner ends, the shoes D present flat faces which, at the opposite ends of the shoes, abut the limiting stop faces 20—20 of the castings 16. It will be evident that the shoes D are thus positively held against inward movement of the gear. Each shoe D is also provided with an outer front wedge face 38 which co-operates with one of the wedge blocks E.

The wedge blocks E, which are two in number, are interposed between the friction shoes D and the casing of the combined yoke and wedge casing member B. The wedge blocks E are also in the form of heavy, laterally elongated bars, and have wedge faces 39—39 on the inner sides thereof, co-operating with the wedge faces 38 of the wedge friction shoes D. The wedge blocks E are fitted to the casing, so that the front ends of the blocks abut the short end wall sections 30 and the top and bottom portions of the blocks, respectively, abut the top and bottom walls 28 of said casing. Inasmuch as the wedge blocks E are held to the wedge casing, the blocks and casing will be moved substantially in unison when the parts are actuated. In other words, the wedge blocks E really form a part of the wedge casing.

The main spring resistance F which, as shown, comprises an inner coil and a relatively heavier outer coil, is disposed within the yoke between the top and bottom arms 26 and is interposed between the inner end of the friction post C and the transverse end section of the yoke proper. The front end of the inner coil of the spring resistance F is seated in a spring follower cap G and abuts the end wall thereof. The spring follower cap G, as clearly shown, slides within the opening 33 provided in the rear wall of the casing and directly engages the foot of the friction post C. As shown in Figures 1 and 2, the parts are so proportioned that the foot portion of the post C is freely accommodated within the opening 31 so that the post may move inwardly of the yoke and effect compression of the spring resistance F. The outer coil of the spring resistance F has the front end thereof bearing on a spring follower ring H which is interposed between the same and the cap G. The rear end portions of both springs of the spring resistance means F bear on a spring follower J, which is interposed between the springs and the end section 27 of the yoke. As shown in Figure 2, the spring follower J is in the form of a plate-like member, having the opposite ends protruding from the sides of the yoke, whereby the plate J is adapted to engage the stop shoulders 17 at the inner ends of the castings 16, thereby limiting the outward movement of the combined casing and yoke member B.

The follower member 34 of the post C, as shown, extends through the openings 23 of the side members 22 and normally engages the inner ends of the stop lugs 115 at the outer ends of the draft sills. It will be evident that the post is thus held against outward movement by the follower 34, but may have inward movement with respect to the member A. The friction shoes D—D and the wedge blocks E—E also have their opposite ends accommodated within the openings 23 in the side members of the yoke element A, thereby permitting inward movement of the element A with respect to the wedge blocks and friction shoes. As clearly illustrated in Figure 2, the friction shoes, in the normal position of the parts, in addition to bearing on the stop shoulders 20 of the castings 16, also engage the inner end walls of the openings 23 of the side members of the yoke element A, whereby upon outward movement of the yoke element A the friction shoes will be pulled outwardly in unison therewith.

As shown, the top and bottom arm members of the yoke section of the member B are of such a width as to fit between the guide sections 19 of the castings 16 and are thereby guided in the longitudinal movement of the parts. It is also pointed out that the inner end portions of the side members 22 of the yoke element A extend between the casing section of the member B and the front end portions of the castings 16 and are guided thereby during the longitudinal movement of the yoke element. The yoke element A and the combined yoke and casing B are directly supported by saddle plates 40 and 41, which are secured to the bottom flanges of the draft sills in any suitable manner, the same being shown as secured by bolts. The saddle plate 40 engages the bottom portion of the casing 25 of the member B and also co-operates with the lower edges of the rearwardly extending side portions 22 of the yoke element A. The saddle plate 41 is disposed at the inner end of the yoke portion of the member B and engages the lower arm 26 thereof.

The normal position of the parts is illustrated in Figures 1 and 2, and, as shown therein, the slots 12, which accommodate the coupler key 15 for movement, are of such a length that the coupler has a longer movement in buff than in draft, the amount of movement permitted in buff being preferably approximately five inches and the movement permitted in draft being approximately two inches. The parts of the mechanism are so proportioned that when the same is fully compressed relative movement of the follower member 34 of the post and the casing section 25 of the member B is limited by engagement of the follower 34 with the front end of the casing. Forward movement of the member B is limited by engagement of the follower J with the inner ends of the stop castings 16.

The operation of my improved friction gear, assuming a pulling or draft action being applied to the coupler 13, is as follows: The yoke element A will be pulled forwardly with the coupler through the medium of the coupler key 15, thereby pulling the wedge friction shoes D—D forwardly also. In the forward movement of the shoes D, the combined yoke and wedge casing member B will be forced forward also through the medium of the interposed wedge blocks E—E. Inasmuch as the front ends of the two coils of the spring resistance F bear directly on the follower cap and ring, which in turn co-operate with the foot portion of the post, the spring resistance will be compressed between the post and the end section 27 of the yoke. During the described action, the friction shoes D—D will move forwardly on the friction surfaces 35 of the post C. Inasmuch as the friction surfaces 35 diverge outwardly, the friction shoes D will be forced laterally apart during their movement on the friction post C, sliding on the inner end walls of the openings 23 of the side members of the yoke element A and effecting a differential action, the wedge faces 38 of the shoes slipping on the wedge faces 39 of the blocks E. The blocks E will thus be forced forwardly at a greater rate of travel than the shoes D, thereby forcing the combined yoke and wedge casing B forwardly and effecting an additional compression of the main spring resistance F. Forward movement of the casing is permitted by the clearance provided between the inner ends of the friction shoes and the rear end wall of the casing, as clearly shown in Figures 1 and 2. Forward movement of the combined casing and yoke B will be positively limited by engagement of the follower J with the rear stop shoulders 17 of the casings 16.

During a buffing action of the mechanism, the coupler 13 will be forced inwardly, thereby carrying the post C therewith. During the inward movement of the post C, the spring resistance F will be compressed against the yoke section of the member B, thereby providing rearward pressure on the friction wedge blocks E—E. Inasmuch as the friction post C is tapered, the friction shoes D, with which the same co-acts, will be forced laterally apart during the inward movement of the post. At this time friction will be created between the post and the friction shoes. Due to the lateral separation of the shoes D, a differential action will be set up between the shoes and the wedge blocks E, the wedge faces 38 of the shoes slipping on the wedge faces 39 of the blocks. Due to the differential action, the wedge friction system will be longitudinally elongated, thereby forcing the combined yoke and wedge casing B forwardly and compressing the spring between the yoke section of the member B and the post C, the required movement of the casing 25 and the shoes D being permitted by providing the clearance between the inner ends of the shoes and the inner end wall of the casing, as clearly shown in Figures 1 and 2. It will thus be evident that the main spring resistance F is compressed from opposite ends during the operation of the gear. The compression stroke during buff will be limited by engagement of the front end of the casing 25 with the follower 34.

When the actuating force is reduced, during release, the expansion of the spring resistance F will restore all of the parts to normal position, the post being forced outwardly until its movement is limited by the follower section thereof engaging the front stop lugs of the draft sills, and rearward movement of the friction shoes D being limited by engagement with the stop shoulders 20 at the front end of the castings 16.

While I have herein shown and described what I consider the preferred manner of carrying out my invention, the same is merely illustrative and I contemplate all changes and modifications which come within the scope of the claims appended hereto.

I claim:

1. In a friction draft gear, the combination with yoke means provided with laterally, inwardly acting wedge means; of a tapered friction post adapted to receive the actuating force when the gear is operated in one direction, said post being movable inwardly of the yoke and held against movement in a reverse direction; differential friction blocks interposed between the friction post and the wedge means of the yoke, said blocks receiving the actuating force when the gear is operated in the reverse direction to effect movement of the blocks with respect to the post longitudinally of the mechanism in one direction; means for holding said blocks against movement in the opposite direction; and spring resistance means directly opposing relative movement of the yoke and post.

2. In a friction draft gear, the combination with a pressure-transmitting member adapted to receive the actuating force applied in one direction; of friction shoes adapted to receive the actuating force applied in a reverse direction, said member and shoes having cooperating friction surfaces and being relatively movable with respect to each other longitudinally of the mechanism during compression of the gear; stop means limiting relative separation of the member and shoes in a direction longitudinally of the mechanism; laterally, inwardly acting wedge means co-operating with the friction shoes; and spring resistance means opposing relative movement of the wedge means and member, said pressure transmitting member serving as an abutment for one end of the spring resistance.

3. In a friction draft gear, the combination with a friction wedge means, including a pressure-transmitting member and co-operating friction wedge elements; of spring means directly opposing relative movement of the pressure-transmitting member and certain of said elements, said last-named elements being held against lateral separation and having wedging engagement with the remaining elements, and said remaining elements having frictional engagement with the pressure-transmitting member along surfaces extending lengthwise of the mechanism.

4. In a draft gear, the combination with a coupler; of a tapered friction post actuated by said coupler upon movement of the latter in one direction; a yoke; friction wedge shoes co-operating with the post; means connecting the coupler and yoke for effecting movement of the shoes when the coupler is moved in the reverse direction; stop means limiting relative separation of the post and shoes, said stop means holding the shoes against movement lengthwise of the mechanism when the post is actuated by the coupler and holding the post against movement when the shoes are actuated by the coupler; a yoke element having laterally, inwardly acting wedge means thereon engaging the shoes; and spring resistance means within the yoke element compressible directly between the post and yoke element opposing relative movement of said post and yoke element toward each other.

5. In a draft gear for railway cars, the combination with draft sills having inner and outer limiting stops thereon; of a coupler; a tapered friction post movable inwardly with the coupler and held against outward movement by said outer stops; friction shoes co-operating with the post; means for effecting outward movement of the shoes in unison with the coupler, said shoes being held against inward movement by the inner stops; a yoke acting element; laterally, inwardly wedge acting means on the yoke, having wedging engagement with the shoes; and spring resistance means within the yoke, compressible directly between the yoke and post for opposing relative movement of the yoke and post toward each other longitudinally of the gear.

6. In a draft gear, the combination with a coupler; of an actuating member movable with a coupler; a friction post having a lost motion connection with the actuating member, said post being engaged by the coupler shank and movable inwardly of the mechanism in unison with the coupler and actuating member; fixed stop means for holding the post against outward movement with the coupler and actuating member; friction shoes co-operating with the post and having a lost motion connection with the actuating member, said shoes being movable outwardly in unison with the actuating member and coupler; stop means for holding the shoes against inward movement; a yoke element having laterally, inwardly acting wedge means at the front end thereof, having wedging engagement with the shoes; and spring resistance means within the yoke, compressible between the post and yoke and opposing movement of the yoke and post toward each other.

7. In a friction draft gear, the combination with draft sills having a set of fixed front stops, a set of fixed rear stops, and a set of fixed intermediate stops; of a friction post having follower means thereon, adapted to receive the actuating force upon inward movement of the coupler, said follower being held against outward movement by said front stops; a yoke element having laterally, inwardly acting wedge means at the outer end thereof, said yoke being engaged by the follower means to limit the inward movement of the post; friction wedge shoes interposed between the wedge means and post and having frictional engagement with the post, said friction shoes being held against inward movement by said intermediate stops; a follower within the yoke at the inner end thereof, said follower being limited in its outward movement by said rear stops; and spring resistance means within the yoke, interposed between the follower and post.

8. In a friction draft rigging, the combination with a yoke; of a movable combined spreading and pressure-transmitting member adapted to receive the actuating force; means co-operating with the yoke and actuated through the movement of said member in one direction for effecting movement of the yoke in a reverse direction, said means including friction elements having frictional engagement with the pressure-transmitting member and adapted to be spread apart by the same; and spring resistance means directly compressible between the pressure-transmitting member and yoke, said spring resistance opposing relative movement of the pressure-transmitting member and yoke.

9. In a friction draft gear, the combination with laterally, inwardly acting wedge means; of a friction post adapted to receive the actuating force when the gear is operated in one direction, said post being movable inwardly of the wedge means and held against movement in a reverse direction; friction blocks interposed between the post and the wedge means, said blocks receiving the actuating force when the gear is operated in a reverse direction to effect movement of the blocks with respect to the post longitudinally of the mechanism in one direction; means for holding said blocks against movement in the opposite direction; and spring resistance means directly opposing relative movement of the wedge means and post.

10. In a friction draft gear, the combination with coupler means; of a wedge casing provided with inwardly acting wedge means; friction wedge blocks cooperating with the wedge means on the casing and actuated in one direction by said coupler means; fixed stop means for holding the blocks against movement in the reverse direction; a pressure transmitting post cooperating with the wedge blocks and actuated by the coupler in said last named direction; fixed stop means holding said post against movement in said first named direction, said casing and post being relatively movable; and spring resistance means directly opposing the relative movement of the post and casing, said spring resistance being compressible to an extent equal to the amount of relative movement of the post and casing.

In witness that I claim the foregoing, I have hereunto subscribed my name this 6th day of April, 1928.

JOHN F. O'CONNOR.